United States Patent [19]
Gataric

[11] Patent Number: 6,072,287
[45] Date of Patent: Jun. 6, 2000

[54] POLYPHASE AC MACHINE CONTROLLER

[75] Inventor: Slobodan Gataric, Vestal, N.Y.

[73] Assignee: Lockheed Martin Corporation, Johnson City, N.Y.

[21] Appl. No.: 09/266,645

[22] Filed: Mar. 11, 1999

[51] Int. Cl.[7] .................................................. H02P 1/54
[52] U.S. Cl. ............................... 318/34; 318/41; 318/49; 318/50
[58] Field of Search ................................. 318/34, 41, 42, 318/44, 49, 50

[56] References Cited

U.S. PATENT DOCUMENTS 4,298,831  11/1981  Espelage et al. ..................... 318/112
5,903,115   5/1999  Taylor ..................................... 318/34

*Primary Examiner*—Robert E. Nappi
*Assistant Examiner*—Rita Leykin
*Attorney, Agent, or Firm*—W. H. Meise; G. H. Krauss

[57] ABSTRACT

A number N of AC machines, such as motors or generators, are independently controlled by a control system having 2N+1 phases, having N orthogonal sets of phase components. In a particular application, a hybrid vehicle including a generator and an induction motor are independently controlled by a five-phase controller having two independent sets of mutually orthogonal components. Each set of components controls one of the machines, and has no net effect on the other machine(s).

8 Claims, 10 Drawing Sheets

6,072,287

POLYPHASE AC MACHINE CONTROLLER

FIELD OF THE INVENTION

This invention relates to multiphase or polyphase AC machine control, and more particularly to independent control of N AC machines by the use of controlled 2N+1-phase components.

BACKGROUND OF THE INVENTION

FIG. 1 is a conventional amplitude-time diagram of three phases of AC current or voltage, with a 120° relative temporal phase ωt, which is often used to describe three-phase systems. The abbreviation AC stands for "alternating current," which in many cases is a misnomer, as the term may refer to either alternating voltage or alternating current, or both. A voltage or current is "alternating" if the instantaneous value dwells periodically at positive values followed by a dwell at a negative value, where the terms "positive" or "negative" refer to direction in an electrical, rather than mechanical, sense. In FIG. 1, the three phases are designated $X_a$, $X_b$, and $X_c$, and may be expressed as $X_a = X \cos wt$, $X_b = X \cos(wt - 2\pi/3)$, and $X_b = X \cos(wt - 4\pi/3)$, respectively. As known to those skilled in the art, FIG. 2 is a two-dimensional vector representation of the currents or voltages of FIG. 1, taken at time t=0. In FIG. 2, two orthogonal α and β components are the fundamental ordinates, and the α axis corresponds with an "a" axis. Two additional b and c axes lie 120° from the a axis. Voltage or current $X_a$ always lies along the a axis, and its instantaneous amplitude changes with time. Similarly, $X_b$ and $X_c$ always lie along the b and c axes, respectively, and their amplitudes also change with time. At the time illustrated in FIG. 2, which corresponds to time t=0 of FIG. 1, the amplitudes of $X_a$, $X_b$ and $X_c$ of FIG. 2 are such as to sum together, to correspond to a vector. As time or temporal phase increases in the plots of $X_a$, $X_b$, and $X_c$ of FIG. 1, vector rotates counterclockwise (in the direction of the arrow ωt) in FIG. 2, tracing out a circle 210. A phase change of 2π results in the tracing of one complete rotation about circle 210. In order to simplify mathematical operations, the values of $X_a$, $X_b$, and $X_c$ may be expressed in terms of the corresponding components α and β.

$$\vec{X} = \begin{bmatrix} X_\alpha \\ X_\beta \end{bmatrix} = T_{abc2\alpha\beta} \begin{bmatrix} X_a \\ X_b \\ X_c \end{bmatrix} \quad (1)$$

where $$[T_{abc\alpha\beta}] = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \quad (2)$$

Equations (1) and (2) taken together represent the matrix transformation that converts a vector expressed in terms of a, b, and c into a vector expressed in terms of α and β components. The above mathematical representation does not take into account common-mode (direct or non-alternating, or alternating) voltage or current which may be associated with the alternating energization. In an AC system, each phase may be associated with a common-mode component, which offsets the alternating component of that phase. The plot of FIG. 2 assumes or represents a situation in which there is no common-mode component. If there is a common-mode component in a balanced three-phase system, it cancels and does not appear in the alpha and beta components. Since the common-mode components cancel, a plot such as that of FIG. 2 would not show them, even if present. However, such a common-mode component may exist, even if it is not represented in the two-dimensional plot of FIG. 2.

In order to represent the direct components, vector X may be represented by the modified transformation set forth below in relation to equations (3) and (4)

$$[X] = \begin{bmatrix} X_\alpha \\ X_\beta \\ X_0 \end{bmatrix} = [T_{abc\alpha\beta}] \begin{bmatrix} X_a \\ X_b \\ X_c \end{bmatrix} \quad (3)$$

$$[T_{abc\alpha\beta}] = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix} \quad (4)$$

where the elements of the lowest row of the matrix, having value "½," represent the common-mode component. The additional $X_0$ component is known as the zero sequence component. The common-mode component which is represented by the zero-sequence component are often represented by a vector orthogonal to the α—β plane of FIG. 2. Application of such a vector orthogonal to the α—β plane results in a three-dimensional system of mutually orthogonal coordinates.

SUMMARY OF THE INVENTION

An 2N+1-phase AC machine arrangement according to an aspect of the invention includes a plurality N of AC machines, where the AC machines may be motors or generators. The arrangement includes N AC machines. Each of the N ac machines has 2N+1 windings through which alternating current flows; naturally, there may be more windings, but the effective number of windings should be 2N+1. The arrangement also includes a controllable 2N+1-phase inverter, for generating 2N+1 phases of current for the N machines. An interconnection arrangement is coupled to the inverter and to the N AC machines, for interconnecting the N windings of the N AC machines so that the current flowing through each winding of each machine flows through windings of each of the others of the N AC machines. A control arrangement is coupled to the inverter, for controlling the 2N+1 phases in N mutually orthogonal sets of phases, for thereby controlling the N AC machines independently of each other. In a particular arrangement according to this aspect of the invention, each of 2N+1 windings of the 2N+1-phase AC machines is electrically oriented in a particular spatial phase progression, and the interconnection arrangement interconnects the windings of the N AC machines in a manner such that the current flowing through a winding of one of the AC machines corresponding to a particular spatial phase flows through a winding of a different spatial phase of another one of the AC machines. In an embodiment of the invention, the flow of one current through the winding of a particular spatial phase in one of the machines flows in a winding of the same spatial phase in another machine.

In a particular arrangement according to an aspect of the invention, N is two and 2N+1 is five, and each of the five windings of the two AC machines is oriented in each machine in a particular spatial phase, and the interconnection arrangement interconnects all five phases of a first one of the two AC machines to corresponding phases of the inverter, and connects one of the windings of the one of the AC machines for current flow through a corresponding winding of the other one of the AC machines.

A method for controlling an AC machine system including N interconnected 2N+1-phase AC machines, where each of the AC machines includes corresponding spatial phase windings, includes the step of generating 2N+1-phase currents representing N mutually orthogonal sets of two-dimensional subsets of currents. The currents are applied through the spatial phase windings of a first of the N AC machines with a particular correspondence of the phases of the currents to the spatial phase of the windings, and applied through the spatial phase windings of a second one of the N AC machines with a correspondence of the phases of the currents to the spatial phase of the windings which differs from the particular correspondence, in such a manner that each of the two-dimensional subsets of the currents independently controls one of the N AC machines. In a particular mode of practicing the method, the step of generating 2N+1-phase currents includes the step of controlling a five-phase inverter coupled to a direct voltage bus. This particular mode of practicing the invention includes the additional step of coupling first and second ones of the N AC machines to first and second wheels of a vehicle. In another mode, the step of controlling a five-phase inverter includes the step of controlling the switches of a five-phase inverter coupled to a traction (or other) battery. In another particular mode of practicing the method according to an aspect of the invention, the step of generating 2N+1-phase currents includes the step of controlling a five-phase inverter coupled to a direct voltage bus, and an additional step is included in which a first one of the N AC machines is coupled to at least a first wheel of a vehicle, and a second one of the N AC machines is coupled to a source of mechanical drive energy, which may be an internal combustion engine.

DESCRIPTION OF THE INVENTION

Figure 1:
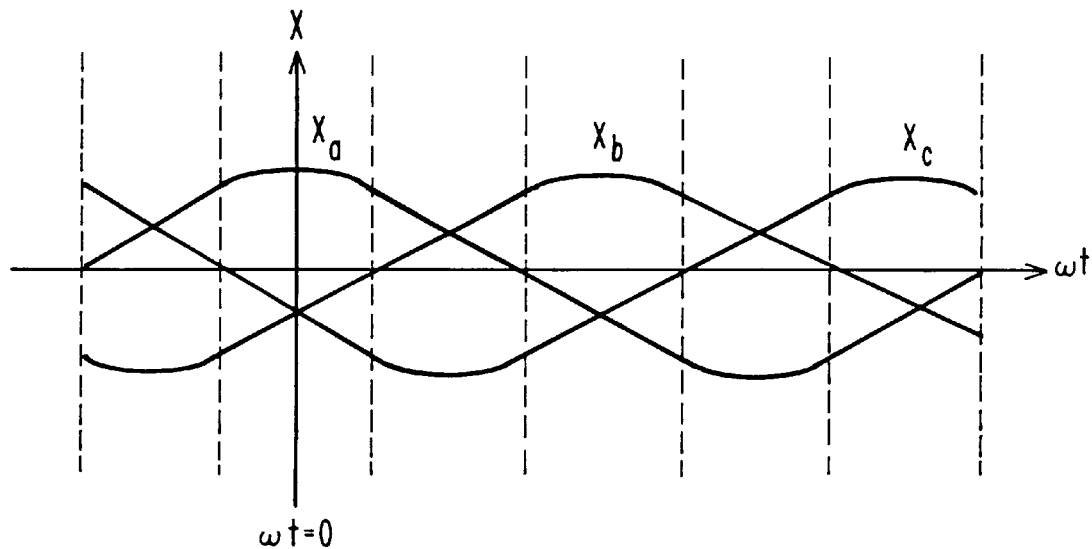
FIG. 1 is a conventional amplitude-time diagram of three phases of current or voltage, with a 120° relative temporal phase ωt, which is often used to describe three-phase systems.
Figure 2:
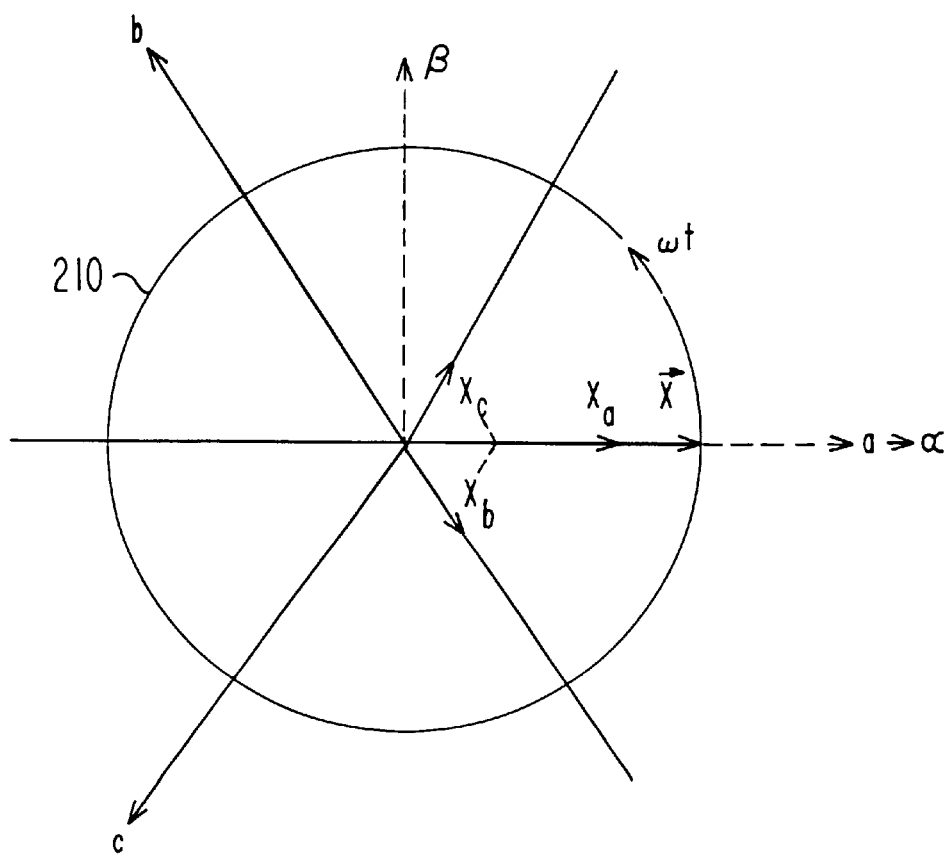
FIG. 2 is a two-dimensional vector representation of the currents or voltages of FIG. 1.
Figure 3A:
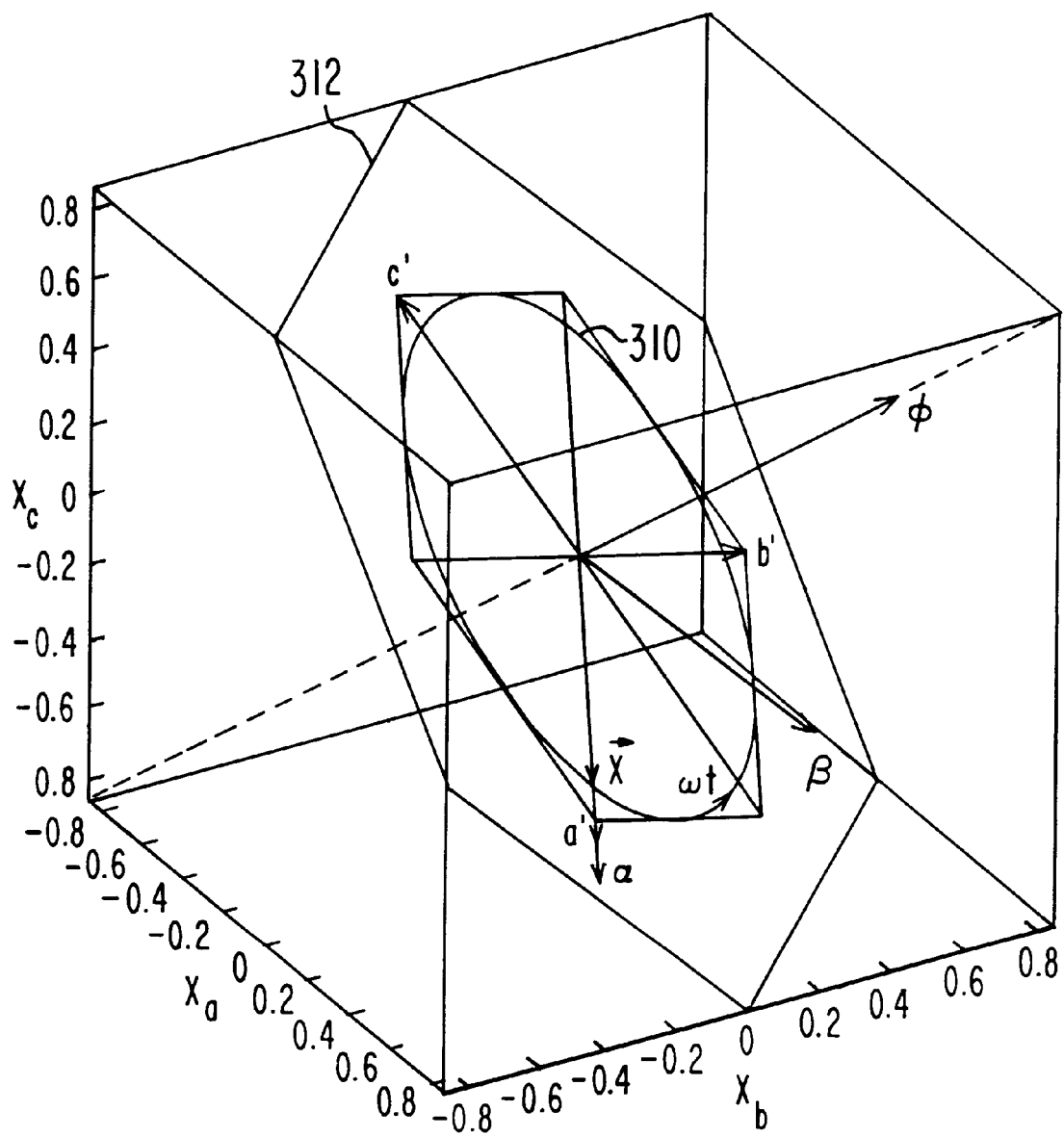
FIGS. 3*a*, 3*b*, and 3*c* are representations of the a, b, and c current or voltage components of FIG. 1 along three mutually orthogonal $X_a$, $X_b$, and $X_c$ axes or Cartesian coordinates.
Figure 3B:
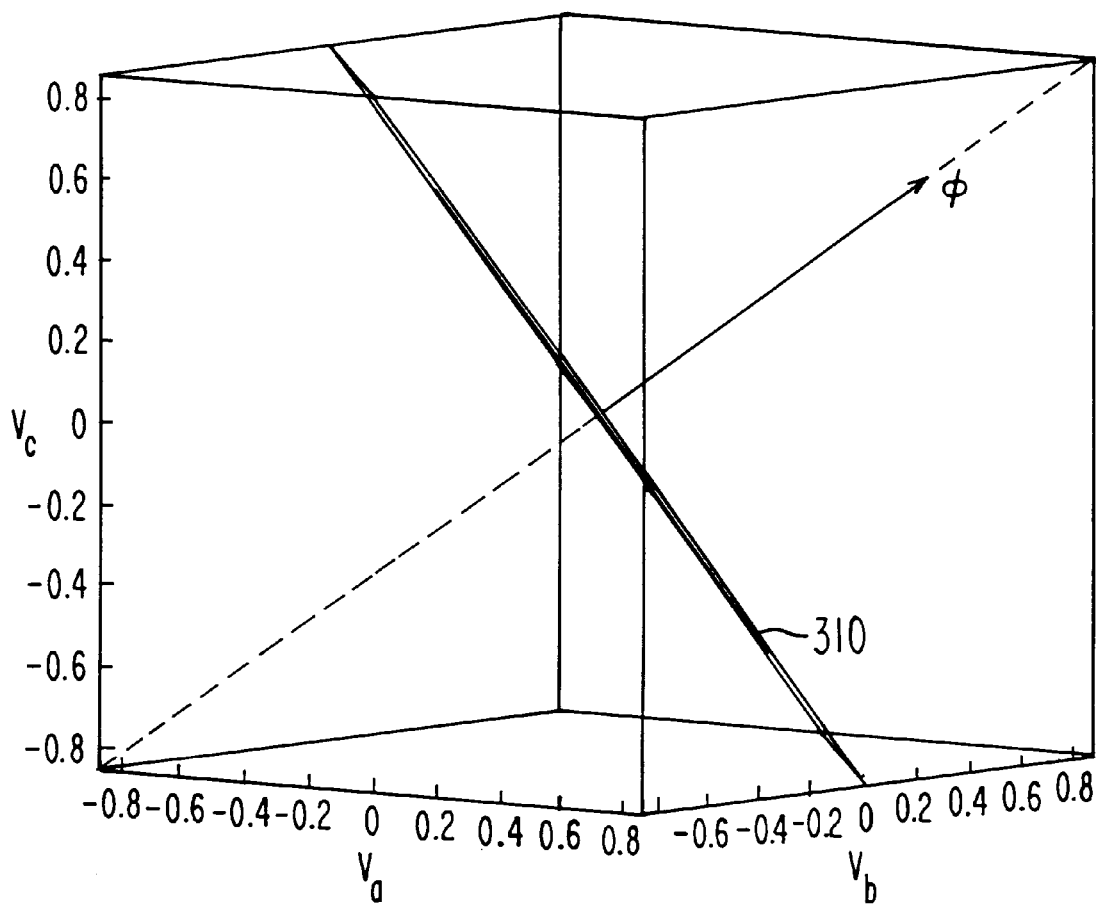
Figure 3C:
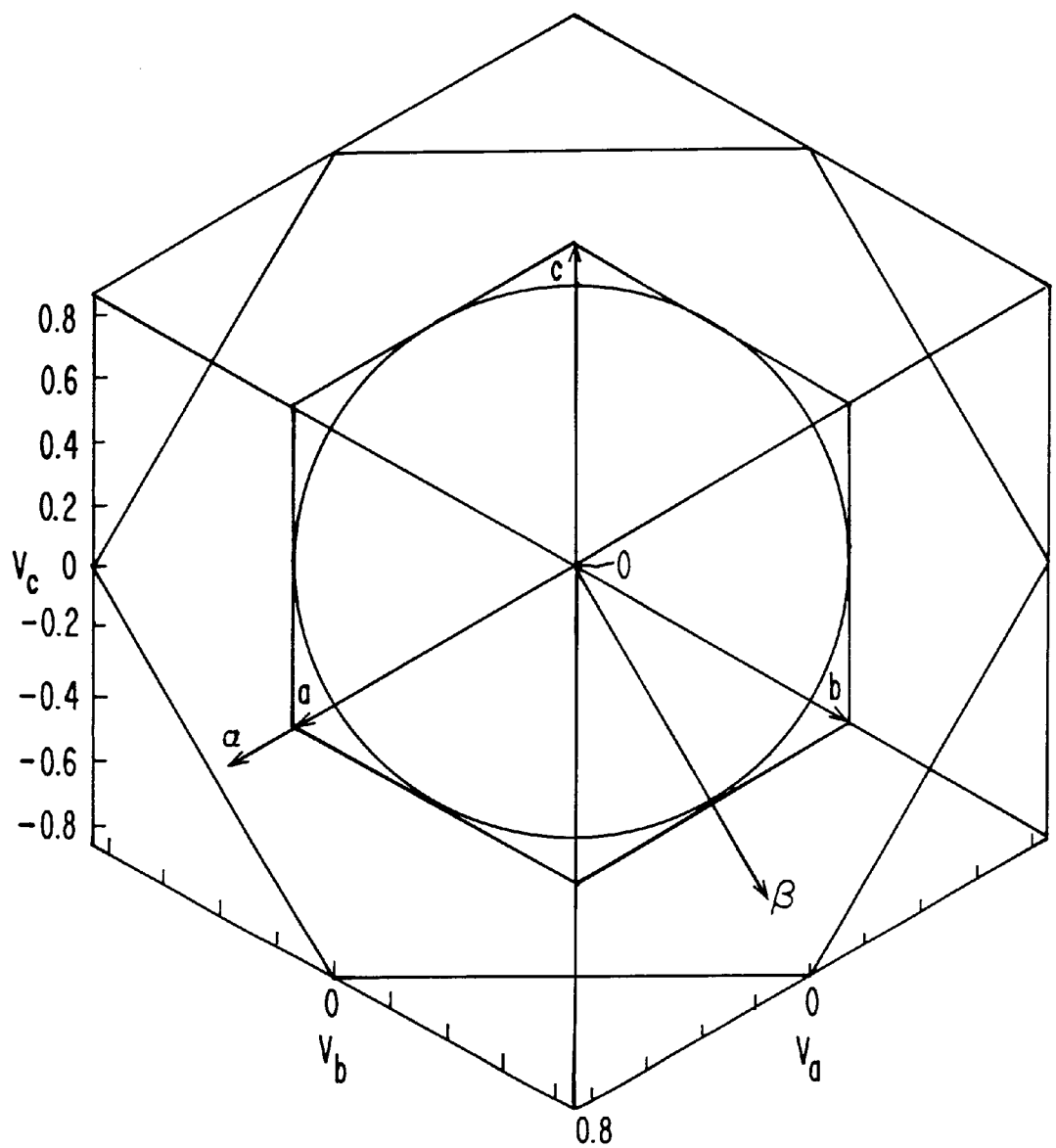

The inventor herein realized that the representation of FIG. 2 is not the only possible representation which can be used, and that other representations provide insights which result in new and useful arrangements. More particularly, FIGS. 3*a*, 3*b*, and 3*c* are representations of the a, b, and c voltage or current components of FIG. 1 along three mutually orthogonal $X_a$, $X_b$, and $X_c$ axes or Cartesian coordinates. The voltage or current components correspond to various instantaneous values along (or on) the $X_a$, $X_b$, and $X_c$ axes. FIGS. 3*a*, 3*b*, and 3*c* are different perspective or isometric views of the same vector arrangement. In FIGS. 3*a*, 3*b*, and 3*c*, the center of the cube coincides with the center or the origin of the coordinate system, in order to simplify the representation. Thus, the coordinates of the center of the cube are 000. A hexagonal plane 312 passes through the origin 000, and cuts the cube into two identical halves. The orthogonal projections of axes $X_a$, $X_b$, and $X_c$ onto plane 312 are designated a', b', and c', respectively, and the three projections are spaced by 120° in the plane. The projections a', b', and c' of FIG. 3 correspond with axes a, b, and c of FIG. 2. As time or temporal phase increases in the plots of $X_a$, $X_b$, and $X_c$ of FIG. 1 in the absence of a zero-sequence component, vector of FIG. 3*a* rotates counterclockwise (in the direction of the arrow ωt), tracing out a circle 310. A phase change of 2π results in one complete rotation about circle 310.

It should be understood that the zero-sequence component may vary with time. The presence of a varying zero-sequence component is represented in FIG. 3*a* by a component lying along the 0 axis, orthogonal to the α and β axes. If the zero-sequence component were fixed in magnitude, it would simply move or translate the plane 312 parallel with the 0 axis, which is a main diagonal of the cube. However, since the zero-sequence component may vary with time in a manner related to the rotation of the vectors representing the components, the plane of the trajectory (the plane of circle 310) tilts relative to plane 312 in response to the presence of such a zero-sequence component.

FIG. 3*b* represents the arrangement of FIG. 3*a* with plane 312 seen edge-on, and FIG. 3*c* represents a view along axis 0.

The transformation between the orthogonal (a, b, c) components of FIG. 2 into the orthogonal (α, β, 0) components of FIG. 3*a*, 3*b*, and 3*c* is given by the matrix transformation [T3]

$$\begin{bmatrix} X_\alpha \\ X_\beta \\ X_0 \end{bmatrix} = [T3] \begin{bmatrix} X_a \\ X_b \\ X_c \end{bmatrix}, \text{ where } [T3] = \begin{bmatrix} \frac{\sqrt{6}}{3} & -\frac{\sqrt{6}}{3} & -\frac{\sqrt{6}}{3} \\ 0 & \frac{\sqrt{2}}{2} & -\frac{\sqrt{2}}{2} \\ \frac{\sqrt{3}}{3} & \frac{\sqrt{3}}{3} & \frac{\sqrt{3}}{3} \end{bmatrix} \quad (5)$$

Equation (5) represents the matrix transformation that converts a vector expressed in terms of a, b, and c components from FIGS. 3a, 3b, and 3c into a vector expressed in terms of α, β, and zero-sequence components. This is merely vector transformation from one coordinate system into another.

The inverse operation is expressed by equation (6)

$$\begin{bmatrix} X_a \\ X_b \\ X_C \end{bmatrix} = [T3^{-1}] \begin{bmatrix} X_\alpha \\ X_\beta \\ X_0 \end{bmatrix}, \text{ where } [T3^{-1}] = \begin{bmatrix} \frac{\sqrt{6}}{3} & 0 & \frac{\sqrt{3}}{3} \\ -\frac{\sqrt{6}}{6} & \frac{\sqrt{2}}{2} & \frac{\sqrt{3}}{3} \\ -\frac{\sqrt{6}}{6} & -\frac{\sqrt{2}}{2} & \frac{\sqrt{3}}{3} \end{bmatrix} \quad (6)$$

According to an aspect of the invention, the representation of a three-phase system in FIGS. 3a, 3b, and 3c allows one to understand that polyphase systems can be represented as a 2N+1-dimensional hypercube. A five-phase system can be represented in a manner which has two mutually orthogonal planes such as plane 312, in addition to a single zero-sequence axis. The two planes so represented for a five-phase system each occupy two dimensions of a four-dimensional sub-space. These two planes, being mutually orthogonal, intersect only at the origin of the coordinate system, and therefore do not interact. This concept can be generalized to any odd number of phases, such as seven, nine, etc. According to an aspect of the invention, N AC machines (motors or generators) are controlled by 2N+1 controlled phases of voltage or current.

Figure 4:
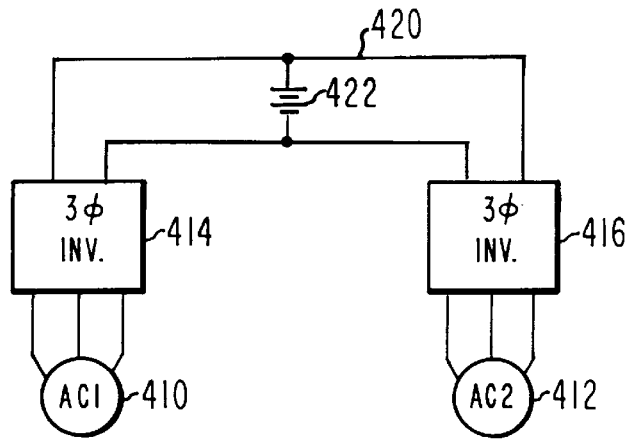
FIG. 4 is a simplified block diagram of an arrangement using two AC machines interconnected by means of inverters and a direct-voltage or -current bus.

FIG. 4 is a simplified block diagram of two AC machines 410 and 412, each connected by means of an inverter 414, 416, respectively, to a direct-voltage bus 420 and a direct-voltage source 422 represented as a battery. Those skilled in the art know that a bus may include more than one electrical conductor. In FIG. 4, either AC machine may be a generator or a motor. In one mode of operation, both machines 410 and 412 are operated as motors, supplying mechanical energy to loads (not illustrated), with the energy being supplied from the source 422 by way of inverters 414 and 416, respectively. In another mode of operation, both machines may be operated as generators, with the electrical energy which they produce being rectified to direct current by the inverters 414 and 416 operated in a rectification mode. In yet another mode of operation, machine 410 may be operated as a generator, and machine 412 as a motor, for supplying energy from machine 410 to source 422 by way of inverter 414, and for supplying energy from the source 422 to machine 412 by way of inverter 416. In this last mode of operation, the energy for motor 412 is ultimately generated by generator 410. Unfortunately, the energy produced by generator 410 must pass through inverters 414 and 416 on its way to motor 412.

Figure 5A:
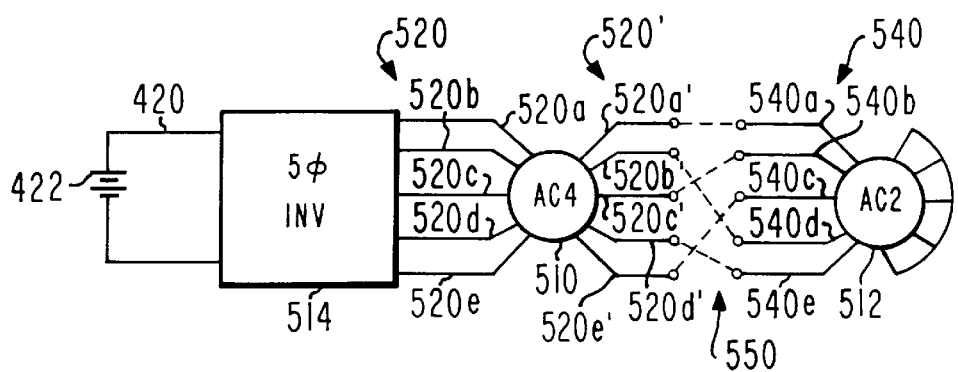
FIG. 5*a* is a simplified block or schematic diagram of a five-phase AC machine arrangement according to an aspect of the invention.
Figure 5B:
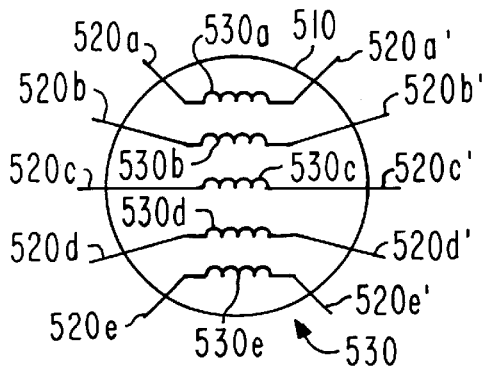
FIGS. 5*b* and 5*c* are diagrams illustrating the windings associated with the AC machines of FIG. 5*a*.

FIG. 5a illustrates an arrangement according to an aspect of the invention. In FIG. 5a, the direct-current source (which also includes a direct-voltage source) is illustrated as a battery 422, which is connected to a direct-current bus 420, as in FIG. 4. Bus 420 is connected to a five-phase inverter 514, which converts the direct voltage or current on bus 420 into five-phase voltage or current on a set 520 of conductors or current paths 520a, 520b, 520c, 520d, and 520e. The currents or voltages flow from set 520 of conductors or current paths, by way of a phase-swapping arrangement 550, to a five-phase AC machine 510. FIG. 5b illustrates the windings associated with AC machine 510 of FIG. 5a with its connections to the conductors or paths of set 520. As illustrated in FIG. 5b, AC machine 510 includes a set 530 of five windings 530a, 530b, 530c, 530d, and 530e. As known to those skilled in the art, the individual windings 530a, 530b, 530c, 530d, and 530e of five-phase set 530 of windings is physically oriented within the machine 510 so that currents or voltages of progressive phase when applied to the windings of the set 530 results in a magnetic field which progresses around the machine. More particularly, when the phases of the currents or voltages applied to windings 530a, 530b, 530c, 530d, and 530e from windings 520a, 520b, 520c, 520d, and 520e, respectively, are in increments of 72°, and phase 1 (0°) is applied by way of path 520a to winding 530a, phase 2 (72°) is applied by way of path 520b to winding 530b, phase 3 (144°) is applied by way of path 520c to winding 530c, phase 4 (216°) is applied by way of path 520d to winding 530d, and phase 5 (288°) is applied by way of path 520e to winding 530e, the physical placement of the windings of set 530 is such that the fields add in-phase to form a rotating field in the machine. This rotating field is capable of transforming electrical energy into mechanical motion, or mechanical motion into corresponding electrical energy. The ends of windings 530a, 530b, 530c, 530d, and 530e remote from conductors 520a, 520b, 520c, 520d, and 520e, respectively, are connected to current paths or conductors 520a', 520b', 520c', 520d', and 520e', respectively. Those skilled in the art know that currents which flow from a conductor into a winding, such as from conductor 520a into winding 530a of FIG. 5b, also flows in the corresponding other connection of the winding, corresponding to connection or path 520a' in the case of winding 530a.

Figure 5C:
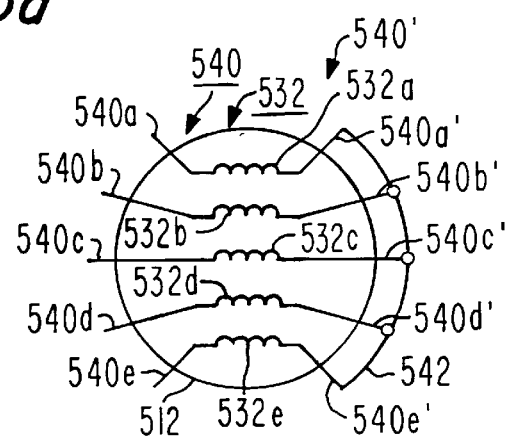

FIG. 5c illustrates the windings associated with AC machine 512 of FIG. 5a, together with its connections to the conductors or paths of a set 540 of conductors or paths. As illustrated in FIG. 5c, AC machine 512 includes a set 532 of five windings 532a, 532b, 532c, 532d, and 532e. Machine 512 of FIG. 5c is also associated with a set 540 of electrical conductors or paths 540a, 540b, 540c, 540d, and 540e. As known to those skilled in the art and as described above, individual windings 532a, 532b, 532c, 532d, and 532e of five-phase set 532 of windings is physically oriented within the machine 512 so that currents or voltages of progressive phase when applied to the windings of the set 530 results in a magnetic field which progresses around the machine. More particularly, when the phases of the currents or voltages applied to windings 532a, 532b, 532c, 532d, and 532e from conductors 540a, 540b, 540c, 540d, and 540e, respectively, are in increments of 72°, and phase 1 (0°) is applied by way of path 540a to winding 532a, phase 2 (72°) is applied by way of path 540b to winding 532b, phase 3 (144°) is applied by way of path 540c to winding 532c, phase 4 (216°) is applied by way of path 540d to winding 532d, and phase 5 (288°) is applied by way of path 540e to winding 532e, the physical placement of the windings of set 540 is such that the fields add in-phase to form a rotating field in AC machine 512. This rotating field is capable of transforming electrical energy into mechanical motion, or mechanical motion into corresponding electrical energy. The ends of windings 532a, 532b, 532c, 532d, and 532e remote from conductors 540a, 540b, 540c, 540d, and 540e, respectively, are connected by way of a set 540' of current paths or conductors 540a', 540b', 540c', 540d', and 540e', respectively, to a common or "short-circuiting" conductor 542. Those skilled in the art know that currents which flow from a conductor into a winding, such as from conductor 540a into winding 532a of FIG. 5c, also flows in the corresponding other connection of the winding, corresponding to connection or path 540a' in the case of winding 532a.

Figure 5D:
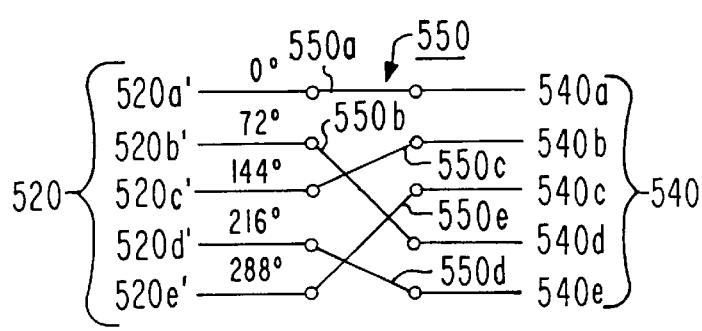
FIG. 5*d* is a simplified diagram of an interchange or phase swapping portion of the arrangement of FIG. 5*a*.

FIG. 5d is a detailed view of one possible interconnection or phase swapping arrangement 550 of FIG. 5a. In FIG. 5d, an interconnection arrangement designated as 550 connects the conductors or current paths of set 520' with the conductors of current paths of set 540 of conductors or current paths. In accordance with an aspect of the invention, the conductors or current paths of interconnection arrangement 550 are connected in a manner which causes the certain currents to result in rotating fields in the associated machine, and to cause other of the currents to result in field cancellation. More particularly, in one of the two AC machines illustrated in FIG. 5a, the fields attributable to currents ($\alpha_1$, $\beta_1$) associated with one of the two orthogonal plane described in conjunction with FIGS. 3a, 3b, and 3c add to produce a rotating field, while those currents ($\alpha_2/\beta_2$) associated with the other one of the two orthogonal planes result in fields which cancel, and which therefore result in no rotational field. In FIG. 5d, conductor 520a', which carries currents or voltages of a phase arbitrarily designated as 0°, is connected by an interconnection path 550a to a corresponding conductor 540a of conductor set 540. A conductor 550b of interconnection set 550 interconnects 72° conductor 520b' of set 520' with conductor 540d of set 540. A conductor 550c of set 550 of conductors interconnects 144° conductor 520c' of set 520' with conductor 540b of set 540, a conductor 550d of conductor set 550 connects 216° conductor 520d' of conductor set 520' to conductor 540e of conductor set 540, and a conductor 550e of conductor set 550 connects 288° conductor 520e' of conductor set 520' to conductor 540c of conductor set 540. With the interconnections illustrated in FIGS. 5a, 5b, 5c, and 5d, the two AC machines 510 and 512 can be operated independently.

The independent operation of the two machines 510 and 512 of FIGS. 5a, 5b, 5c, and 5d can be thought of as arising out of operation of each of the two machines in a three-phase manner, which for each machine requires currents or voltages which sum to produce the rotating fields. These voltages or currents for each machine can be viewed as being the $\alpha$ and $\beta$ components described in conjunction with FIGS. 2, 3a, 3b, and 3c, lying in a plane, but in which the two planes ($\alpha_1$, $\beta_1$) and ($\alpha_2$, $\beta_2$) are orthogonal, as described above. The total five-phase voltage or current may be viewed as being the vector sum of the voltage or currents associated with the two orthogonal planes. The orthogonality of the two planes has the physical result that the components of the five-phase voltages or currents associated with a first plane sum or add together to form a rotating field, while the voltages or currents associated with the second of the two orthogonal planes cancel. The addition or cancellation is dependent upon how the phases add within each machine. The interconnection arrangement of FIGS. 5a and 5d, in conjunction with the winding arrangements of FIGS. 5b and 5c, results, in AC machine 510, in addition of the fields associated with one plane ($\alpha_1$, $\beta_1$), and cancellation of fields associated with the second plane ($\alpha_2$, $\beta_2$), while in machine 512, the phases are rearranged in a fashion which results in addition or summation to produce rotating fields from the second plane ($\alpha_2$, $\beta_2$), and cancellation of fields associated with the first plane ($\alpha_1$, $\beta_1$).

Figure 6:
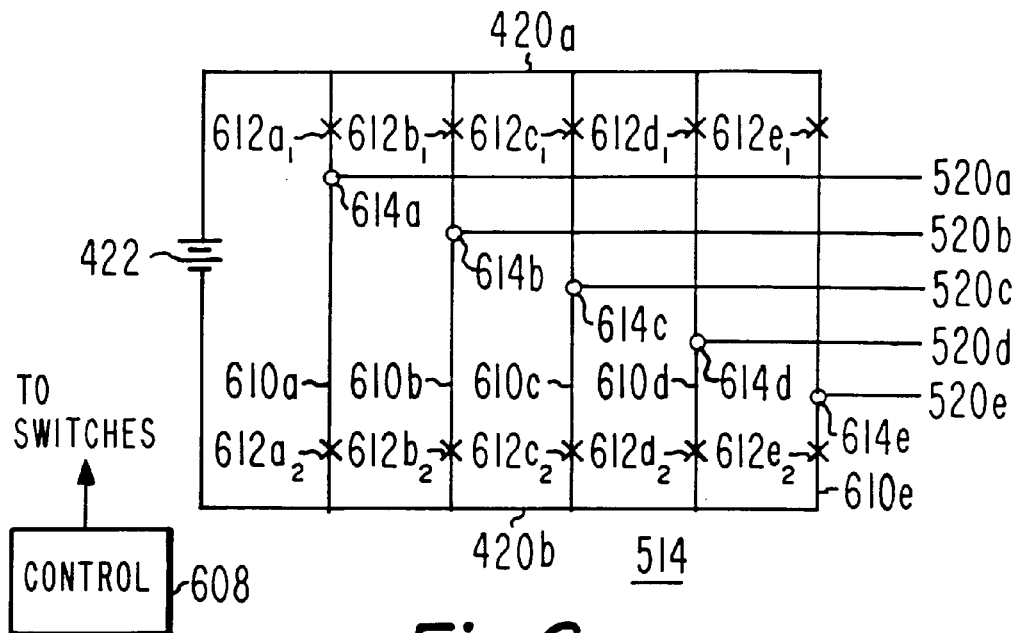
FIG. 6 is a simplified diagram, in schematic and block form, of a five-phase inverter according to an aspect of the invention.

FIG. 6 is a simplified representation of a five-phase inverter which may be used in the arrangement of FIG. 5a. In FIG. 6, the direct voltage or direct current bus 420, including current paths 420a and 420b, is connected across source 422. Five controlled current paths 610a, 610b, 610c, 610d, and 610e extend from conductor 420a to 420b. Each path 610a, 610b, 610c, 610d, and 610e includes two controllable switches, which are illustrated by Xs. Current path 610a includes an upper switch 612a, and a lower switch $612a_2$, with a tap 614a therebetween. Current path 610b includes an upper switch $612b_1$ and a lower switch $612b_2$ with a tap 614b therebetween, current path 610c includes an upper switch $612c_1$ and a lower switch $612c_2$ with a tap 614c therebetween, current path 610d includes an upper switch $612d_1$ and a lower switch $612d_2$ with a tap 614d therebetween, and current path 610e includes an upper switch $612e_1$ and a lower switch $612e_2$ and a tap 614e therebetween. The AC conductors 520a, 520b, 520c, 520d, and 520e of set 520 of conductors are connected to taps 614a, 614b, 614c, 614d, and 614e, respectively. Inverter 514 of FIG. 6 also includes a switch controller illustrated as a block 608 which controls the switches in a manner appropriate for generation of five-phase currents or voltages. Controllers for switched inverters are well known in the art, and a controller for five-phase operation should be well within the knowledge of a person of average skill in the art.

Figure 7:
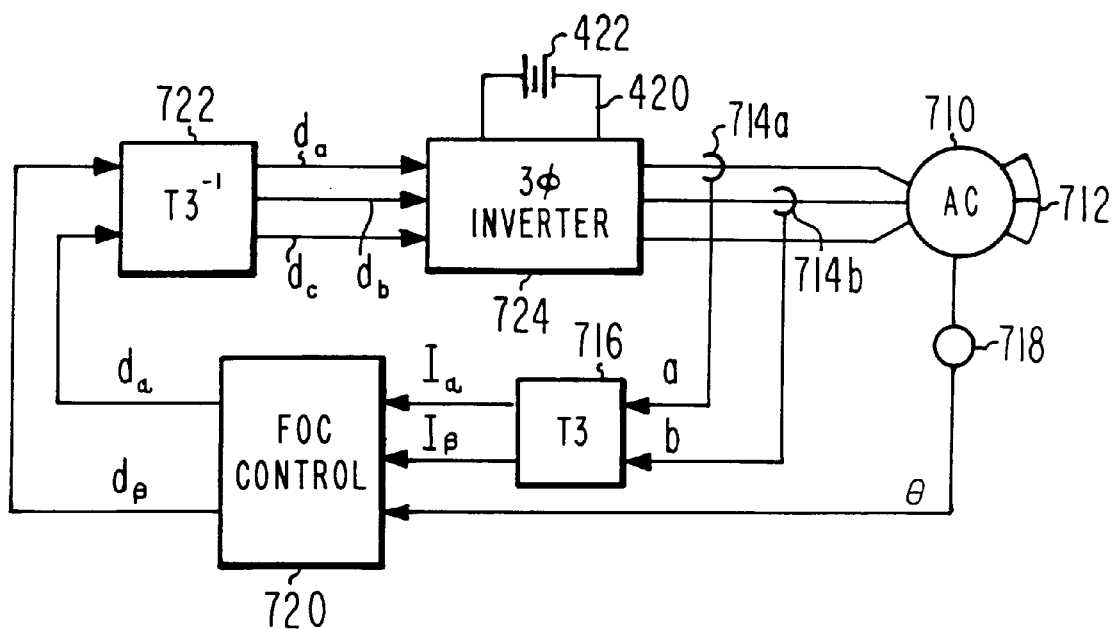
FIG. 7 is a simplified diagram in block and schematic form of a prior-art AC machine control arrangement.

FIG. 7 is a simplified block diagram of a prior-art three-phase AC machine controller of the Field-Oriented Control (FOC) type. In FIG. 7, the AC machine is an induction machine (motor or generator) 710 driven by a, b, and c phases having relative 0°, 120°, and 240° phases. A common current path or short-circuiting bus is illustrated as 712. Current samplers illustrated as 714a and 714b sample the currents in the a and b conductive paths, and couple signal samples to a T3 block 716. Block 716 determines the current in conductor c from $I_a+I_b+I_c=0$, and performs the T3 transformation from (a,b,c) coordinates to ($\alpha,\beta$) coordinates. The resulting $I_\alpha$ and $I_\beta$ are coupled, together with information relating to armature or rotor angle θ from a sensor 718, to an FOC controller 720. Such controllers are known in the art, and are not further discussed herein. Controller 720 produces $d_\alpha$ and $d_\beta$ duty cycle control signals, which are applied to an inverse transformation T3$^{-1}$ illustrated as a block 722, which converts the $d_\alpha$ and $d_\beta$ duty cycle control signals into $d_a$, $d_b$, and $d_c$ control signals. The $d_a$, $d_b$, and $d_c$ control signals are applied to a three-phase inverter 724, which controls the power flow to and from a bus 420 and an associated source illustrated as a battery 422. One particular application of an arrangement such as that of FIG. 7 is as the drive system of a hybrid electric vehicle, in which context the source 422 is a traction battery, the motor 710 drives at least one wheel of the vehicle, and the FOC controller 720 receives other control signals indicative of the amount of power which is to be coupled to the motor, the amount of regenerative braking to be employed, and various other signals.

In the abovementioned hybrid electric vehicle application, another AC machine in the form of an electric generator driven by a fuel-operated machine may be connected to the three-phase inverter, as described in greater detail in U.S. Pat. No. 5,828,201, issued Oct. 27, 1998 in the name of Hoffman et al.; 5,869,950, issued Feb. 9, 1999 in the name of Hoffman et al.; allowed patent application Ser. No. 09/044,671, filed Mar. 20, 1998 in the name of Lyons et al.; application Ser. No. 09/192,645 filed Nov. 16, 1998 in the name of Jones et al.; allowed patent application Ser. No. 09/044,669 filed Mar. 20, 1998 in the name of Lyons et al.; application Ser. No. 09/044,670 filed Mar. 20, 1998 in the name of Lyons et al.; application Ser. No. 09/044,676, filed Mar. 20, 1998 in the name of Lyons et al.; application Ser. No. 09/039,896 filed Mar. 16, 1998 in the name of Lyons; application Ser. No. 09/039,895 filed Mar. 16, 1998 in the name of Gataric et al.; application Ser. No. 09/177,011 filed Oct. 22, 1998 in the name of Chady et al., application Ser. No. 09/080,148 filed May 18, 1998 in the name of Lyons et al.; and Provisional application Ser. No. 60/083,419, filed Apr. 29, 1998 in the name of Petersen et al.

Figure 8:
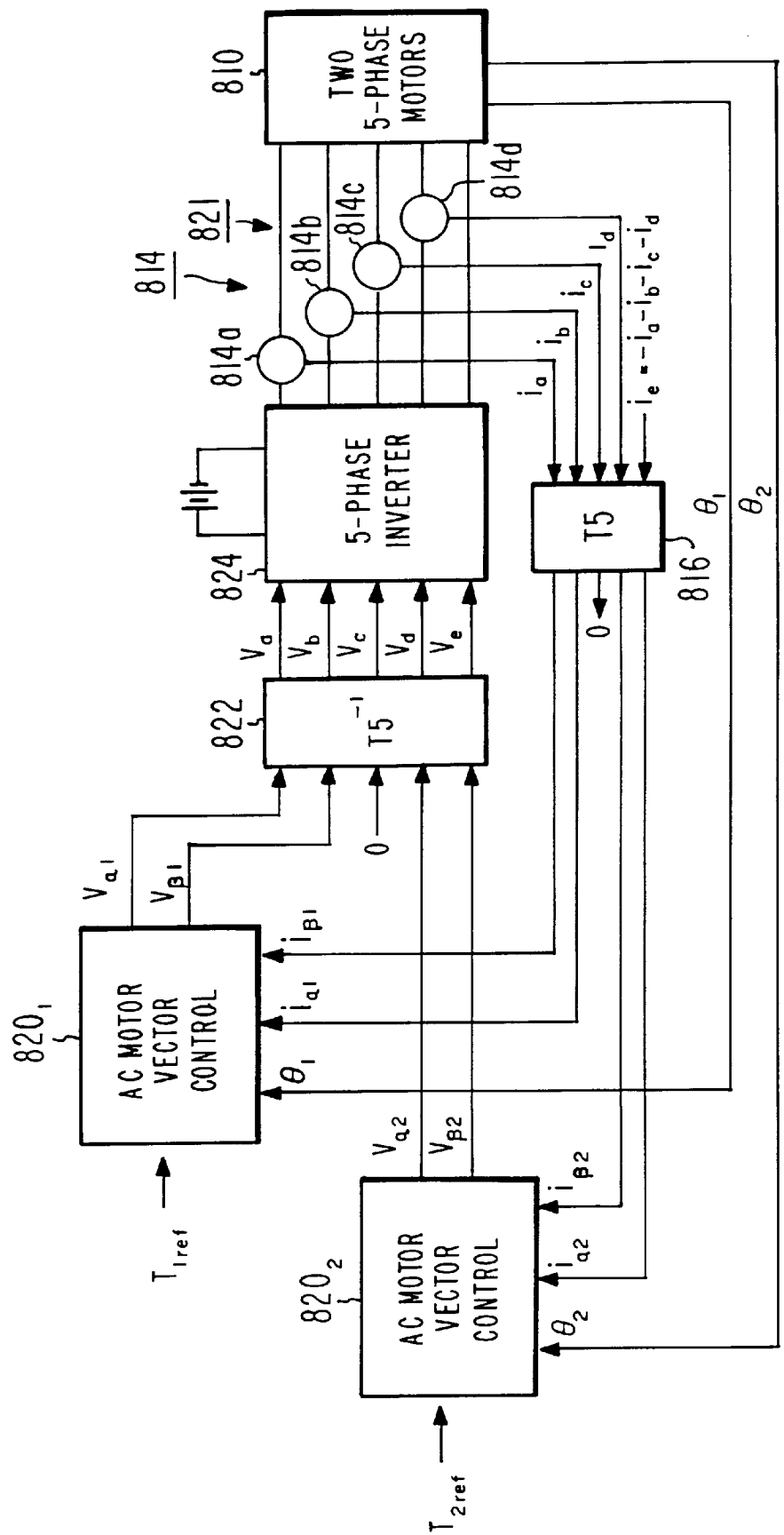
FIG. 8 is a simplified diagram in block and schematic form of an arrangement according to an aspect of the invention, in which two AC machines are controlled independently by a five-phase controller.
Figure 9A:
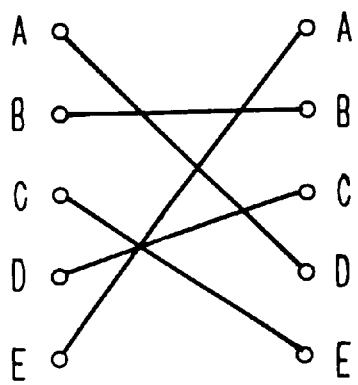
FIGS. 9*a*, 9*b*, 9*c*, 9*d*, 9*e*, 9*f*, 9*g*, 9*h*, and 9*i* are simplified representations of alternative swapping circuits which, together with the arrangement of FIG. 5*d*, make up the ten possible solutions to the defining equations.
Figure 9B:
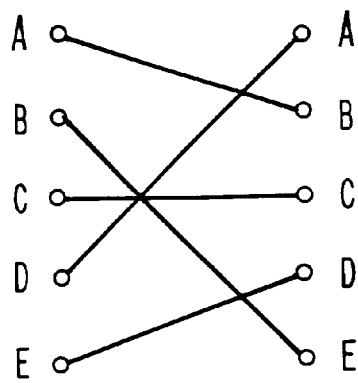
Figure 9C:
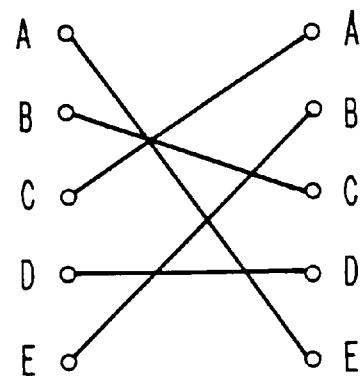
Figure 9D:
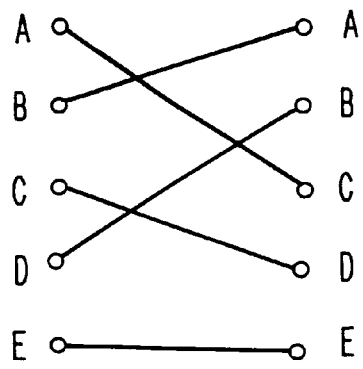
Figure 9E:
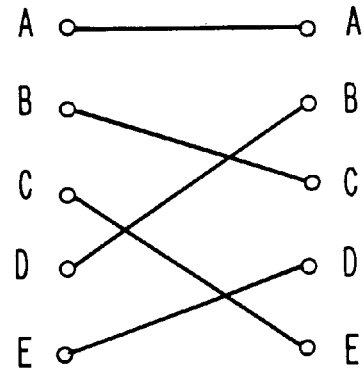
Figure 9F:
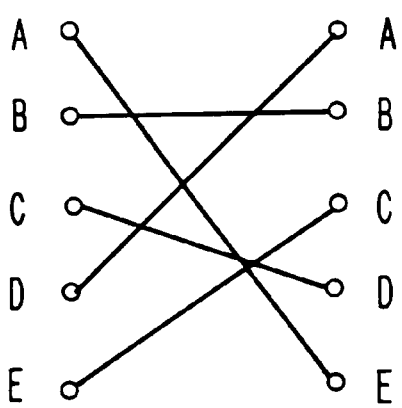
Figure 9G:
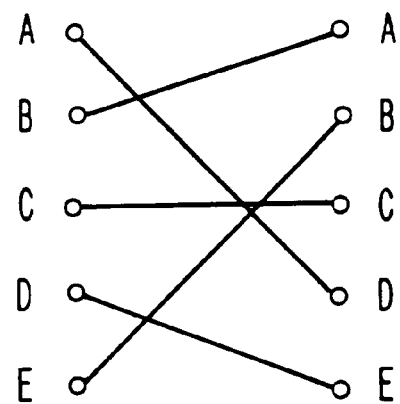
Figure 9H:
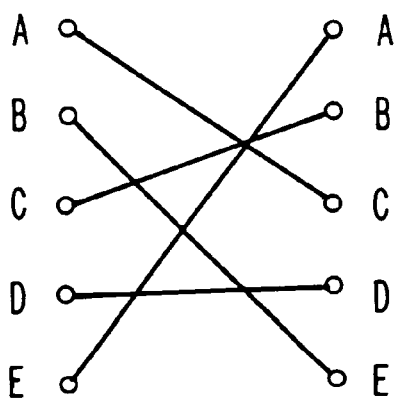
Figure 9I:
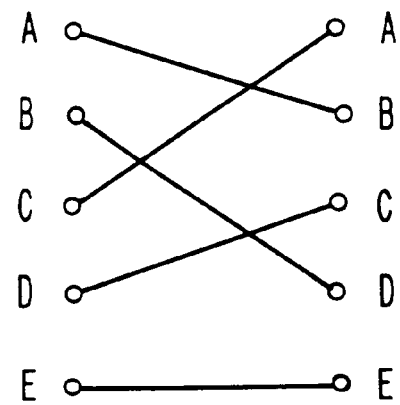

According to an aspect of the invention, an FOC controlled arrangement uses five-phase control of a pair of AC machines. FIG. 8 illustrates an arrangement according to this aspect of the invention. In FIG. 8, a controlled five-phase inverter 824 produces five-phase voltage or current on a set 821 of conductors, for application to two five-phase motors, connected as in FIG. 5a, illustrated together as a block 810. Four current sensors of a set 814 of current sensors, namely those designated 814a, 814b, 814c, and 814d, sense the currents in their respective conductors or current paths, and couple corresponding signals $i_a$, $i_b$, $i_c$, and $i_d$ to a T5 block 816, which determines the value of the fifth (e) current, which was not measured, and which converts the currents measured in terms of a,b,c,d, and e components into currents in two mutually orthogonal planes, plus a zero-sequence component. More particularly, block 816 of FIG. 8 transforms or converts $i_a$, $i_b$, $i_c$, $i_d$ and $i_e$ into $i_{\alpha 1}$, $i_{\beta 1}$ and $i_{\alpha 2}$, $i_{\beta 2}$ components, and a 0 component. The $i_{\alpha 1}$ and $i_{\beta 1}$ components are applied, together with $\theta_1$ sensor information relating to the angular position of the rotor associated with the first motor, to a block $820_1$, designated "AC motor vector control," which is the FOC controller for the first motor of the two five-phase motors of block 810. The output of FOC controller $820_1$ includes control signals $V_{60\,1}$ and $V_{\beta 1}$, which are applied to a $T5^{-1}$ transformation block 822. The $i_{\alpha 2}$ and $i_{\beta 2}$ components produced by block 816 are applied, together with $\theta_2$ sensor information relating to the angular position of the rotor associated with the second motor, to a block $820_2$, designated "AC motor vector control," which is the FOC controller for the second motor of the two five-phase motors of block 810. The output of FOC controller $820_2$ includes control signals $V_{\alpha 2}$ and $V_{\beta 2}$, which are applied to $T5^{-1}$ transformation block 822, together with the $V_{\alpha 1}$ and $V_{\beta 1}$ commands from FOC controller $820_1$ and the zero-sequence current signal from block 816. Block 822 performs a $T5^{-1}$ transformation to convert the $V_{\alpha 1}$, $V_{\beta 1}$, 0, $V_{\alpha 2}$ and $V_{\beta 2}$ signals into five-phase inverter control signals $V_a$, $V_b$, $V_c$, $V_d$, and $V_e$ signals. The $V_a$, $V_b$, $V_c$, $V_d$, and $V_e$ signals produced by block 822 are applied to five-phase inverter block 824 for control of the set 612 of switches of FIG. 6.

The T5 block 816 of FIG. 8 represents a transformation between (a, b, c, d, e) coordinates and ($\alpha 1$, $\beta 1$, 0, $\alpha 2$, $\beta 2$) coordinates. More particularly, the transformation is set forth in equation (7)

$$\begin{bmatrix} v_{\alpha 1} \\ v_{\beta 1} \\ v_0 \\ v_{\alpha 2} \\ v_{\beta 2} \end{bmatrix} = T5 \begin{bmatrix} v_a \\ v_b \\ v_0 \\ v_d \\ v_e \end{bmatrix} \quad (7)$$

where one possible solution of matrix [T5] is set forth in equation (8).

$$[T5] = \begin{bmatrix} \frac{\sqrt{10}}{5} & \frac{\sqrt{10}}{20}(\sqrt{5}-1) & -\frac{\sqrt{10}}{20}(\sqrt{5}+1) & -\frac{\sqrt{10}}{20}(\sqrt{5}+1) & \frac{\sqrt{10}}{20}(\sqrt{5}-1) \\ 0 & \frac{\sqrt{5}}{10}\left(\sqrt{5+\sqrt{5}}\right) & \frac{\sqrt{5}}{10}\left(\sqrt{5-\sqrt{5}}\right) & -\frac{\sqrt{5}}{10}\left(\sqrt{5-\sqrt{5}}\right) & -\frac{\sqrt{5}}{10}\left(\sqrt{5+\sqrt{5}}\right) \\ \frac{\sqrt{5}}{5} & \frac{\sqrt{5}}{5} & \frac{\sqrt{5}}{5} & \frac{\sqrt{5}}{5} & \frac{\sqrt{5}}{5} \\ \frac{\sqrt{10}}{5} & -\frac{\sqrt{10}}{20}(\sqrt{5}+1) & \frac{\sqrt{10}}{20}(\sqrt{5}-1) & \frac{\sqrt{10}}{20}(\sqrt{5}-1) & -\frac{\sqrt{10}}{20}(\sqrt{5}+1) \\ 0 & -\frac{\sqrt{5}}{10}\left(\sqrt{5-\sqrt{5}}\right) & \frac{\sqrt{5}}{10}\left(\sqrt{5+\sqrt{5}}\right) & -\frac{\sqrt{5}}{10}\left(\sqrt{5+\sqrt{5}}\right) & \frac{\sqrt{5}}{10}\left(\sqrt{5-\sqrt{5}}\right) \end{bmatrix} \quad (8)$$

Similarly, the matrix $[T5^{-1}]$ of block 822 of FIG. 8 is defined by equation (9)

$$\begin{bmatrix} v_a \\ v_b \\ v_c \\ v_d \\ v_e \end{bmatrix} = [T5^{-1}] \begin{bmatrix} v_{\alpha 1} \\ v_{\beta 1} \\ v_0 \\ v_{\alpha 2} \\ v_{\beta 2} \end{bmatrix} \quad (9)$$

where matrix $[T5^1]$ is set forth in equation (10).

$$[T5^{-1}] = \begin{bmatrix} \frac{\sqrt{10}}{5} & 0 & \frac{\sqrt{5}}{5} & \frac{\sqrt{10}}{5} & 0 \\ \frac{\sqrt{10}}{20}(\sqrt{5}-1) & \frac{\sqrt{5}}{10}\left(\sqrt{5+\sqrt{5}}\right) & \frac{\sqrt{5}}{5} & -\frac{\sqrt{10}}{20}(\sqrt{5}+1) & -\frac{\sqrt{5}}{10}\left(\sqrt{5-\sqrt{5}}\right) \\ -\frac{\sqrt{10}}{20}(\sqrt{5}+1) & \frac{\sqrt{5}}{10}\left(\sqrt{5-\sqrt{5}}\right) & \frac{\sqrt{5}}{5} & \frac{\sqrt{10}}{20}(\sqrt{5}-1) & \frac{\sqrt{5}}{10}\left(\sqrt{5+\sqrt{5}}\right) \\ -\frac{\sqrt{10}}{20}(\sqrt{5}+1) & -\frac{\sqrt{5}}{10}\left(\sqrt{5-\sqrt{5}}\right) & \frac{\sqrt{5}}{5} & \frac{\sqrt{10}}{20}(\sqrt{5}-1) & -\frac{\sqrt{5}}{10}\left(\sqrt{5+\sqrt{5}}\right) \\ \frac{\sqrt{10}}{20}(\sqrt{5}-1) & -\frac{\sqrt{5}}{10}\left(\sqrt{5+\sqrt{5}}\right) & \frac{\sqrt{5}}{5} & -\frac{\sqrt{10}}{20}(\sqrt{5}+1) & \frac{\sqrt{5}}{10}\left(\sqrt{5-\sqrt{5}}\right) \end{bmatrix} \quad (10)$$

There are at least ten solutions, one of which is manifested in the phase swapping arrangement of FIG. 5d. The other nine solutions produce different shifts, which are illustrated in FIGS. 9a, 9b, 9c, 9d, 9e, 9f, 9g, 9h, and 9i, and require no further explanation.

Figure 10:
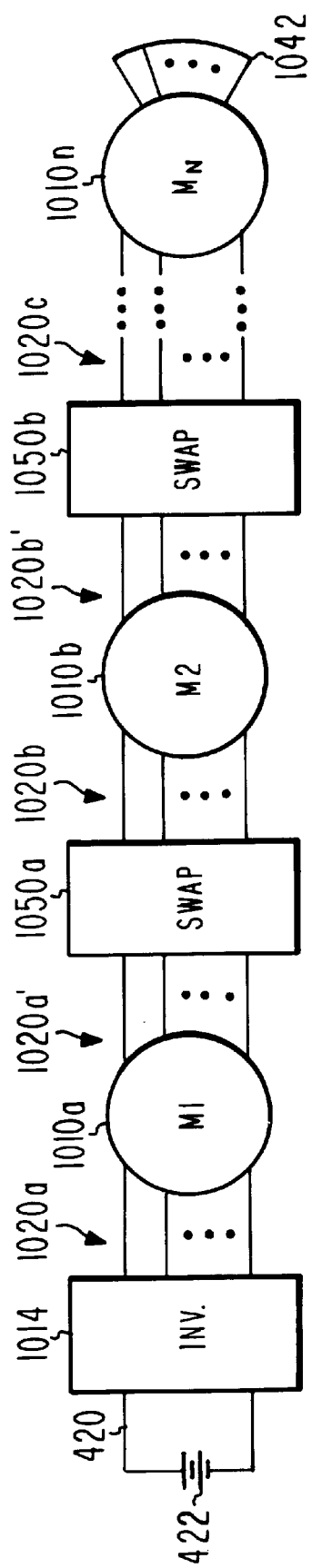
FIG. 10 is a simplified generalized representation of N machines controlled by an (2N+1)-phase controller.

FIG. 10 illustrates a general N-machine system using 2N+1 phases. In FIG. 10, elements corresponding to those of FIG. 5a are designated by like reference numerals. Battery 422 is coupled by bus 420 to a (2N+1)-phase inverter, which produces (2N+1)-phase drive according to the invention on (2N+1) conductors of a set 1020a of conductors. Set 1020a connects to a set of (2N+1) connections of a (2N+1)-winding machine 1010a. The other ends of the (2N+1) windings of machine 1010a are connected by way of a set 1020a' of conductors to the a first phase swapping block 1050a. The phase-swapping block is connected by way of a set 1020b to the terminals of a second machine 1010b, also having (2N+1) windings. The other ends of the windings of machine 11010b are connected by way of a set 1020b' to a second phase swapping block 1050b. The output of phase swapping block 1050b is connected by way of a further set 1020c of conductors, . . ., and so forth, until the last set of conductors is connected to terminals of the N$^{th}$ machine 1010N. The (2N+1) terminals of machine 1010N which are remote from the other machines are connected to a common conductor 1042.

Other embodiments of the invention will be apparent to those skilled in the art. For example, those skilled in the art know that the controllers of the various embodiments may include analog or digital circuits, or both. The terms "between" and "across" when used in the context of an electrical system have meanings which are not the same as their meanings in mechanics or space. While the descriptions of the controllers have not adverted to use of the AC machines as both generators and motors, depending upon the drive and load conditions to which the machines are subject, they may operate in either mode, depending upon those conditions, and the "inverter" portion of the system may in the case of operation as a generator perform a function equivalent to rectification, to extract AC energy from the generator, and to couple that energy to the direct voltage or current bus. While sensing of current by sensors of current sensors set 814 has been described for four particular phases, namely for phases a, b, c, and d, those skilled in the art know that any N–1 phases of an N-phase system may be sensed, and the N$^{th}$ can be determined by calculation.

Thus, a 2N+1-phase (five-phase) AC machine (410, 412, 510, 512, 710, 810) arrangement according to an aspect of the invention includes a plurality N of AC machines (410, 412, 510, 512, 710, 810), where the AC machines (410, 412, 510, 512, 710, 810) may be motors or generators. The arrangement includes N AC machines (410, 412, 510, 512, 710, 810). Each of the N ac machines (410, 412, 510, 512, 710, 810) has 2N+1 windings (530, 532) through which alternating current flows; naturally, there may be more windings (530, 532), but the effective number of windings (530, 532) should be 2N+1. The arrangement also includes a controllable 2N+1-phase inverter (414, 416, 514, 724, 824), for generating 2N+1 phases of current for the N machines (410, 412, 510, 512, 710, 810). An interconnection arrangement (550) is coupled to the inverter (414, 416, 514, 724, 824) and to the N AC machines (410, 412, 510, 512, 710, 810), for interconnecting the N windings (530, 532) of the N AC machines (410, 412, 510, 512, 710, 810) so that the current flowing through each winding of each machine (410, 412, 510, 512, 710, 810) flows through windings (530, 532) of each of the others of the N AC machines (410, 412, 510, 512, 710, 810). A control arrangement (608, 716, 720, 722, 816, 8201, 8202, 822) is coupled to the inverter (414, 416, 514, 724, 824), for controlling the 2N+1 phases in N mutually orthogonal sets of phases, for thereby controlling the N AC machines (410, 412, 510, 512, 710, 810) independently of each other. In a particular arrangement according to this aspect of the invention, each of 2N+1 windings (530, 532) of the 2N+1-phase AC machines (510, 512, 810) is electrically oriented in a particular spatial phase progression, and the interconnection arrangement (550) interconnects the windings (530, 532) of the N AC machines (510, 810) in a manner such that the current flowing through a winding (530b) of one of the AC machines (510, 512, 810) corresponding to a particular spatial phase (b) flows through a winding (532d) of a different spatial phase (d) of another one of the AC machines (512, 810). In an embodiment of the invention, the flow of one current through the winding (530a) of a particular spatial phase (a) in one of the machines (510, 810) flows in a winding (532a) of the same spatial phase (a) in another machine (512, 810).

In a particular arrangement (FIGS. 5a, 8) according to an aspect of the invention, N is two and 2N+1 is five, and each of the five windings (the windings of sets 530 and 532) of the two AC machines (510, 512, 810) is oriented in each machine (510, 512, 810) in a particular spatial phase, and the interconnection arrangement (550) interconnects all five phases of a first one of the two AC machines (510) to corresponding phases of the inverter (514, 824), and connects one of the windings (530a) of the one of the AC machines (510) for current flow through a corresponding winding (532a) of the other one of the AC machines (512).

A method according to the invention for controlling an AC machine system including N interconnected 2N+1-phase AC machines, where each of the AC machines includes corresponding spatial phase windings, includes the step of generating 2N+1-phase currents representing N mutually orthogonal sets of two-dimensional subsets of currents. The currents are applied through the spatial phase windings of a first of the N AC machines with a particular correspondence of the phases of the currents to the spatial phase of the windings, and applied through the spatial phase windings of a second one of the N AC machines with a correspondence of the phases of the currents to the spatial phase of the windings which differs from the particular correspondence, in such a manner that each of the two-dimensional subsets of the currents independently controls one of the N AC machines. In a particular mode of practicing the method, the step of generating 2N+1-phase currents includes the step of controlling a five-phase inverter coupled to a direct voltage bus. This particular mode of practicing the invention includes the additional step of coupling first and second ones of the N AC machines to first and second wheels of a vehicle. In another mode, the step of controlling a five-phase inverter includes the step of controlling the switches of a five-phase inverter coupled to a traction battery. In another particular mode of practicing the method according to an aspect of the invention, the step of generating 2N+1-phase currents includes the step of controlling a five-phase inverter coupled to a direct voltage bus, and an additional step is included in which a first one of the N AC machines is coupled to at least a first wheel of a vehicle, and a second one of the N AC machines is coupled to a source of mechanical drive energy, which may be an internal combustion engine.

What is claimed is:

1. An 2N+1-phase AC machine induction motor/generator arrangement, comprising:

N AC machines, each of said N ac machines having 2N+1 windings through which alternating current flows;

a controllable 2N+1-phase inverter for generating 2N+1 phases of current for driving said N machines;

interconnection means coupled to said inverter and to said N AC machines, for interconnecting said N windings of said N AC machines so that the current flowing through each winding of each machine flows through windings of each of the others of said N AC machines; and control means coupled to said inverter, for controlling said 2N+1 phases in N mutually orthogonal sets of phases, for thereby controlling said N AC machines independently of each other.

2. An arrangement according to claim 1, wherein each of 2N+1 windings of said 2N+1-phase AC machines is electrically oriented in a particular spatial phase progression; and said interconnection means interconnects said windings of said N AC machines in a manner such that the current flowing through a winding of one of said AC machines corresponding to a particular spatial phase flows through a winding of a different spatial phase of another one of said AC machines.

3. An arrangement according to claim 1, wherein N is two and 2N+1 is five, and each of the five windings of said two AC machines is oriented in each machine in a particular spatial phase; and said interconnection means interconnects all five phases of a first one of said two AC machines to corresponding phases of said inverter, and connects one of said windings of said one of said AC machines for current flow through a corresponding winding of the other one of said AC machines.

4. A method for controlling an AC machine system including N interconnected 2N+1-phase AC machines, each of which AC machines includes corresponding spatial phase windings, said method comprising the steps of:

generating 2N+1-phase currents representing N mutually orthogonal sets of two-dimensional subsets of currents;

applying said currents of said 2N+1 phases through said spatial phase windings of a first of said N AC machines with a particular correspondence of said phases of said currents to said spatial phase of said windings; and applying said currents of said 2N+1 phases through said spatial phase windings of a second one of said N AC machines with a correspondence of said phases of said currents to said spatial phase of said windings which differs from said particular correspondence, in such a manner that each of said two-dimensional subsets of said currents independently controls one of said N AC machines.

5. A method according to claim 4, wherein:

said step of generating 2N+1-phase currents includes the step of controlling a five-phase inverter coupled to a direct voltage bus;

and comprising the additional step of coupling first and second ones of said N AC machines to first and second wheels of a vehicle.

6. A method according to claim 5, wherein said step of controlling a five-phase inverter includes the step of controlling the switches of a five-phase inverter coupled to a traction battery.

7. A method according to claim 4, wherein:

said step of generating 2N+1-phase currents includes the step of controlling a five-phase inverter coupled to a direct voltage bus;

and comprising the additional step of coupling a first one of said N AC machines to at least a first wheel of a vehicle, and coupling a second one of said N AC machines to a source of mechanical drive energy.

8. A method according to claim 7, wherein said step of coupling a second one of said N AC machines to a source of mechanical drive energy includes the step of coupling said second one of said N AC machines to an internal combustion engine.

* * * * *